United States Patent [19]
Lee et al.

[11] 3,859,575
[45] Jan. 7, 1975

[54] VARIABLE CAPACITANCE SENSOR

[76] Inventors: Shih-Ying Lee; Yao-Tzu Li, both of Huckleberry Hill, Lincoln, Mass. 01773

[22] Filed: Feb. 11, 1974

[21] Appl. No.: 441,026

[52] U.S. Cl. .............................. 317/246, 73/398 C
[51] Int. Cl. .............................................. H01g 7/00
[58] Field of Search ........ 317/246, 249 R; 73/398 C

[56] References Cited
UNITED STATES PATENTS

| | | | |
|---|---|---|---|
| 2,179,068 | 11/1939 | Sprague | 317/249 R |
| 3,230,431 | 1/1966 | Deniston | 317/249 R |

Primary Examiner—E. A. Goldberg
Attorney, Agent, or Firm—Kenway & Jenney

[57] ABSTRACT

A variable capacitance sensor is constructed with its capacitance plates connected at their center. The conducting surfaces forming the capacitor are insulated from the central connection and each other. Stress relieving means are provided to eliminate hysteresis effects from the connecting structure. The structure provides decreased thermal path lengths to reduce thermal effects. The change in capacitance producted by a displacement in response to supplied pressure or force is increased by maximizing the displacement at peripheral regions having the largest area.

6 Claims, 4 Drawing Figures

VARIABLE CAPACITANCE SENSOR

PRIOR ART

Variable capacitance sensors of prior art construction typically have a deformable member such as a diaphragm, bellows or beam which forms one plate and can be moved relative to a base structure by the actuating force or pressure. An electrode plate rigidly connected to, but electrically insulated from, the base and in close proximity to the deformable member forms the other portion of the variable capacitance. Conventional capacitance sensors of this type have several significant disadvantages. Proper alignment is very difficult to achieve. Since reasonable values of capacitance and high relative change of capacitance with plate movement require very small gap dimensions, typically on the order of 0.001 inches, proper control of parallelism and gap dimensions is very important. To achieve proper alignment of the capacitor plates very precise and small tolerances must be placed upon the component parts.

The typical prior art capacitor has, for example, a deformable capacitance plate supported as the end of a closed hollow cylindrical section affixed to the base. Within the cylindrical structure a fixed electrode is supported at the desired initial gap from the deformable plate.

The possibilities for degradation of performance by thermal shift in structural alignment is difficult to avoid with a conventional structure having inherently long thermal paths in the structure determining the relative positions and alignment of capacitance plates. The thermal problems include both the changes induced by different ambient temperatures and the transient effects produced when a temperature change occurs. The problems are additionally complicated by the fact that structural requirements for particular portions, such as the elastic properties of the diaphragm material, make it difficult to choose materials such that there may be a cancellation of the effects caused by thermal expansion. A further disadvantage of existing structures is that the mounting stresses which are almost inevitable as the structure is firmly affixed to the system being measured, cause distortions in one or both of the capacitance plate and support structures. This distortion can cause not only a shift in the initial value of the capacitance but also a change in the rate at which capacitance changes with applied force. A further disadvantage of conventional structures is the fact that the greatest diaphragm motion is at the center of the capacitance plate where the area is smallest. At the outer rim the area is larger but the motion is small so that a total change of capacitance for a given motion is relatively small.

The present invention minimizes the problems associated with prior art structures through the provision of a variable capacitance sensor having the two capacitance plates connected at their center. As will be more fully described hereinafter in connection with certain preferred embodiments, this arrangement serves to minimize alignment problems, to eliminate and minimize sources of thermal shift, to substantially eliminate capacitance shifts due to mounting stress, and to increase the capacitance change for a given motion.

DRAWINGS

DETAILED DESCRIPTION OF THE INVENTION

Figure 1:
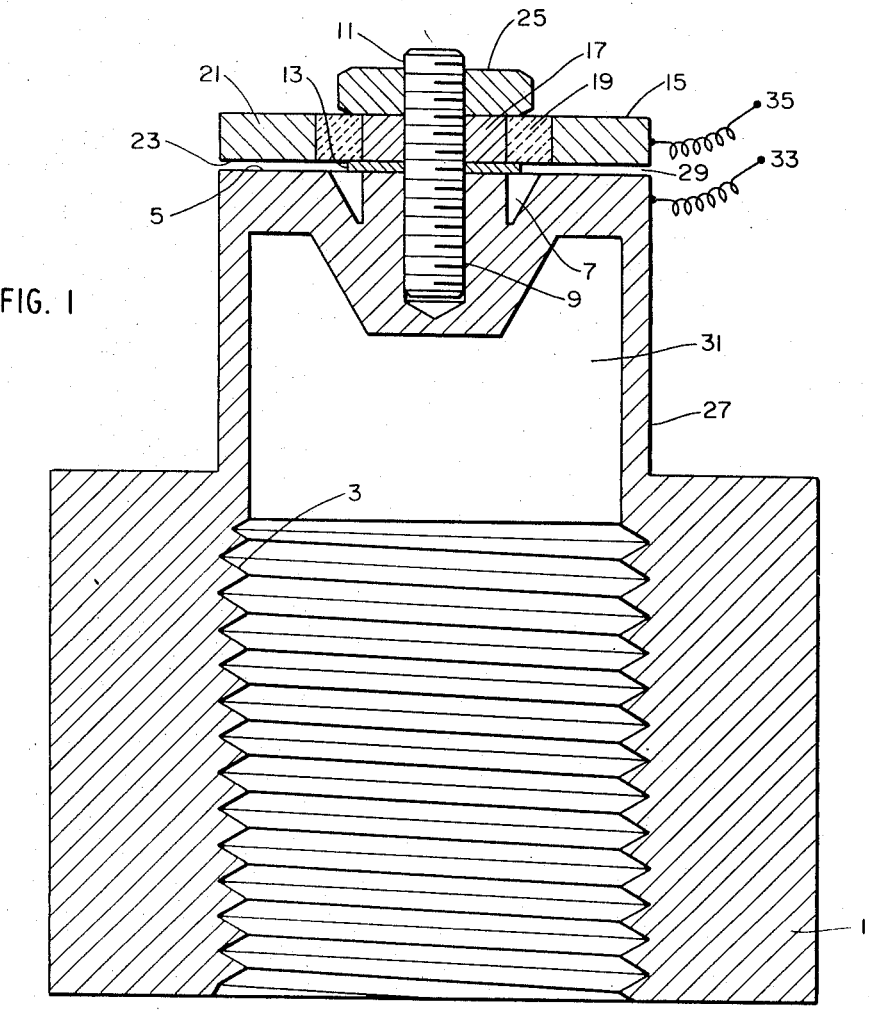
FIG. 1 is a cross-section view of a variable capacitor according to the present invention.

Referring now to FIG. 1, a rigid base section 1 is provided with internal threads 3 so that it may be affixed to the system containing a fluid whose pressure is to be monitored. A portion in line with the threaded sections has a surface 5 formed or machined as a plane surface. A groove 7 is formed in the surface 5. At the center of the surface 5 a threaded section 9 is formed in the base structure to receive a threaded stud 11. A plane spacing washer 13 separates capacitor plate assembly 15. Assembly 15 is composed of a central ring 17, an insulating portion 19, and a conductive portion 21. The plane washer 13 assures that the surface 23 of conducting portion 21 which is opposite to surface 5 is both parallel to surface 5 and spaced therefrom by the precise amount determined by the washer 13. For a typical application both the base 1 and the stud 11 may be fabricated from hardened steel to provide good elastic qualities and small hysteresis. Sections 17 and 21 may desirably be constructed of stainless steel. Glass is a suitable insulating material for section 19 and provides extremely small thermal shifts. The nut 25 which holds the capacitor plate assembly together is preferably of the same material as stud 11.

For a typical precision application the diameter of the base structure 1 at the cylindrical portion 27 is approximately one half inch, the groove 7 reduces the effective cross-section to approximately 0.010 inches, the gap 29 between surfaces 23 and 5 is approximately 0.001 inches, the capacitance plate assembly 15 and nut 25 are both approximately 0.040 inches thick and the stud 11 is approximately 0.080 inches in diameter or number 2 screw size. The structure of FIG. 1 permits very precise gap dimensions. For the most critical application surfaces 5 and 23 may be lapped to extreme flatness. If a parallel washer 13 is also used, the surfaces 5 and 23 will be both parallel and of extremely precisely determined separation. Despite the extreme precision obtained, other elements of the structure do not need to be machined to very close tolerances. Only the capacitance surfaces 5 and 23 need to be lapped, an operation which can be performed with readily available equipment at low manufacturing cost. A stamped washer from industrial grade sheet metal is usually sufficiently parallel.

The total effective length of the support structure insofar as portions which might effect the effective capacitance structure due to thermal shifts are concerned is only the thickness of spacing washer 13. Therefore, any thermally induced shifts are extremely small. Moreover, since the structure is completely symmetrical and supported at the center, any thermal shift does not introduce a distortion into the structure. Since the portion of the base structure 1 which is affixed to the system to be measured is not involved in the capacitance sensing, any mounting distortion will not affect the value of rate of change of the capacitance sensor. In operation an increase in fluid pressure within the central volume 31 will cause an increased separation between surfaces 5 and 23. This increased separation results in a lowered capacitance which may be sensed by leads 33 and 35 connected to conventional measurement systems, preferably a system such as that described in Lee and Li U.S. Pat. No. 3,518,536.

The inner groove 7 serves to eliminate hysteresis effects which might otherwise be present. If the groove were not present the motion necessary to cause an increase in separation between the surfaces 5 and 23 could involve frictional slippage between the washer and the surfaces mating with it. With the groove 7 the surfaces 8 and 10 adjacent the washer 13 do not change position with respect to the washer so that hysteresis effects due to frictional slippage are eliminated.

Figure 2:
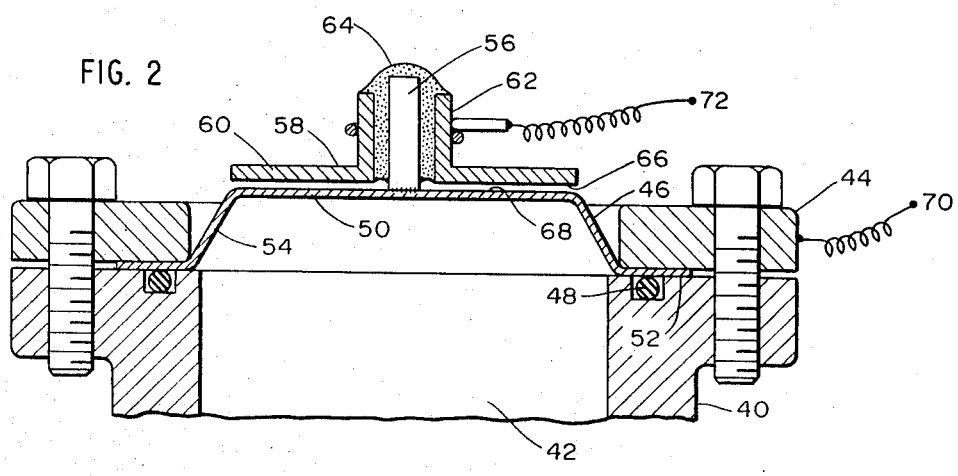
FIG. 2 is a cross-section view of an embodiment particularly well adapted to high volume low-cost manufacturing techniques.

FIG. 2 shows an embodiment particularly well adapted for high volume, low cost manufacturing techniques. Nonetheless extremely good initial value and rate of change tolerances are possible. In the embodiment shown the variable capacitor assembly is clamped to a base structure 40 having an internal volume 42 showing the fluid whose pressure is to be monitored. A clamping ring 44 clamps the diaphragm support structure 46 to the base 40. An O-ring 48 provides a fluid type seal. The plate 46 has a central flat portion 50, an outer flat portion 52 clamped between ring 44 and base 40, and a connecting portion 54. At the center of part 46 a post 56 is affixed by spot welding or other conventional mounting techniques. Capacitor plate assembly 58 has an outer plane section 60 and a central cylindrical section 62. The central cylindrical section 62 is affixed to the central post 56 by adhesive material 64. Typically the material 64 may be an epoxy resin cement to ensure the correct spacing of the facing surfaces 66 and 68 of plate portions 60 and 50 respectively. Shims of the desired thickness are inserted while the cement 64 sets.

The operation of the structure of FIG. 2 is like that of the structure of FIG. 1, and again an increase in the fluid pressure will cause an increase in the separation of the surfaces 66 and 68 forming the facing capacitor plate surfaces, so that the capacitance sensed through the measurement system attached to leads 70 and 72 will decrease. The separation between surfaces 66 and 68 increases more rapidly at the perimeter than in portions more centrally located. This fact does not affect instrument performance however, other than to affect the calibration constant of the capacitance sensor, and as noted earlier, the increase in separation is greatest in the portions with the greatest surfaced area as contrasted with prior art deivces where the increase and separation is greatest in the central portion having the least area.

The structure of FIG. 2 may be very economically fabricated in quantity by stamping the plate assembly 46 in one operation, affixing the stud 56 by automatic machinery, and spacing the plate assembly 58 from plate 46 in a centering fixture while the cement 64 is applied and sets.

If desired the initial calibration of the capacitance sensor of FIG. 2 may be obtained by deforming the structure by an initial preload sufficient to permanently deform plate assembly 46. If this technique is utilized, the initial assembly need merely provide sufficient central gap to ensure that the plate structures 58 and 46 are electrically insulated from each other. Then the plate assembly 46 is deformed to provide an effective gap between surfaces 66 and 68 giving the desired initial capacitance value.

Figure 3:
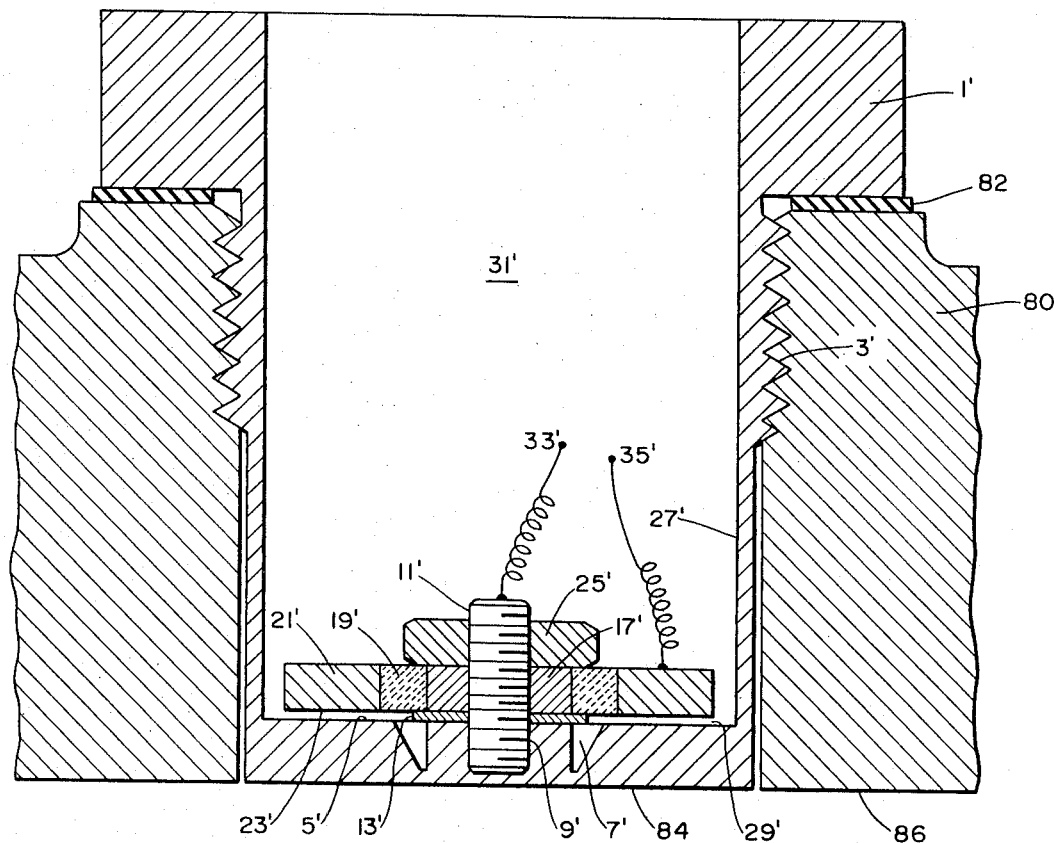
FIG. 3 is a cross-section view of a flush mounted embodiment suited for high precision applications.

Referring now to FIG. 3, a flush mounted capacitor sensor according to the present invention and adpated for high precision applications is shown. Elements which are the functional equivalent of corresponding elements in FIG. 1 are identified by primed numbers of the same identifying numeral. The base unit 1' is screwed into a section 80 of the system containing the fluid to be monitored. The capacitor sensor mechanism is dimensioned so that its fluid contacting surface 84 is flush with the adjacent surface 86 of the structure 80. A gasket 82 provides a fluid type seal. For high precision devices the surfaces 5' and 23' as well as the surfaces of the washer 13' are lapped to precise dimensions. An increase in fluid pressure will cause the surface 84 to be deformed away from the fluid so that the spacing between surfaces 5' and 23' increases. This increase in capacitor plate spacing causes a decrease in the capacitance which is sensed by measuring devices attached to leads 33' and 35' in a manner corresponding to that described in conjunction with FIG. 1. Suitable materials correspond with those materials described as suitable for corresponding portions of the structure of FIG. 1. Again thermal stability is very good because the only thermal path link which affects the sensors capacitance is the thickness of the washer 13'. Since the insulating area 19 provides electrical separation, the washer 13' may be of any desired material with a low coefficient of expansion. The material is not in contact with the fluid being measured so that any effect of that fluid upon the material need not be considered. Indeed, the thermal path provided by the washer thickness is so short that thermally induced changes in capacitance will be very low over a large temperature range.

Figure 4:
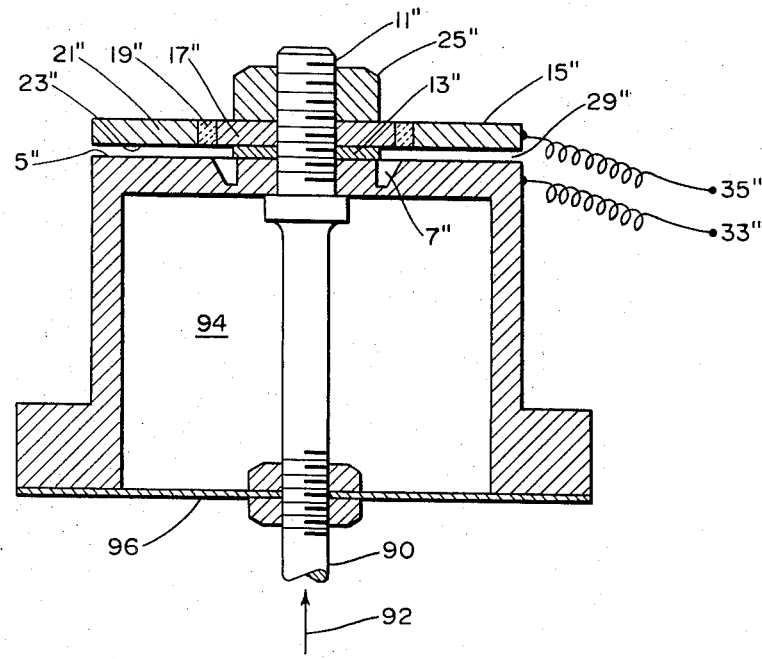
FIG. 4 is a cross-section view of an embodiment adapted to measure an applied force.

FIG. 4 illustrates in cross-section an embodiment suitable for force measuring applications. Rod 90 serves to transmit an applied force to the sensing capacitor. If, for example, a force is applied in the direction indicated by arrow 92, the force will cause the rod to move in the direction of the applied force and thus cause increased separation between the conductive surfaces 5" and the surface 23". This increased separation causes a decrease in the capacitance formed by the facing surfaces 23" and 5". The change in capacitance may be sensed through leads 33" and 35" as discussed above in connection with the embodiments of FIGS. 2 and 3. To eliminate hysteresis effects caused by rubbing of the washer 13" and annular groove 7" is provided as in embodiments of FIGS. 1 and 3. If the forces being measured are so small that any slight change in the volume 94 enclosed by diaphragm 96 would create forces which are significant or measurable in relation to the applied force, pressure relieving holes or apertures may be provided in diaphragm 96. The primary function of diaphragm 96 is to ensure continued centering of rod 90 through which the force 92 is applied. Other portions of the embodiment of FIG. 4 have been marked with double primed numerals corresponding to the numerals of corresponding portions of the embodiments of FIGS. 1 and 3. Since these portions perform in an identical manner, their description is not repeated here and every portion has not been identified with a numeral.

While the structures of FIGS. 1, 3 and 4 have shown a stud and nut assembly technique, the assembly could be by a cemented structure as shown in FIG. 2, could involve simply cementing the washer 13 between the two plate assembly surfaces without any other connecting member, or could involve cementing the insulating angular portion 19 or 19' directly to a stud or central pillar.

While the connection in FIG. 2 is shown as entirely adhesive between the stud 56 and the capacitor plate assembly 62, if desired a cylindrical insulating spacer corresponding to that portion of the cement 64 between plate assembly 62 and stud 56 could be cemented in place with a thin layer of cement.

Having this described my invention, I claim:

1. A pressure sensing capacitor comprising an edge-supported elastic member responsive to pressure having a conducting portion, a flat electrode member with a central support means, a periphery conductive means and an insulative means connecting said periphery conductive means and said central support means in fixed spaced relationship, means physically in contact with the center of said elastic member responsive to pressure and said central support means and spacing said periphery conductive means and said conducting portion of said elastic member in capacitive relationship whereby when force is applied to the center of the elastic member the spacing between the conducting portion and the periphery conductive means will vary.

2. Apparatus according to claim 1 wherein said conducting portion and periphery conductive means are substantially parallel surfaces.

3. Apparatus according to claim 1 wherein said conducting portion and periphery conducting means are substantially equidistant at equal radial distances from the center of said elastic member.

4. Apparatus according to claim 1, wherein said elastic member incorporates an annular groove adjacent the means spacing said periphery conductive means and said elastic member whereby hysteresis effects which would otherwise be present as the magnitude of applied forces is increased and decreased are substantially eliminated.

5. Apparatus according to claim 1, wherein force is applied by an element connecting with the central portion of said elastic member.

6. Apparatus according to claim 1 wherein said insulative means connecting said periphery conducting means and said central support means in fixed spaced relationship is formed by cement holding said periphery conductive means and said insulative means in fixed relationship.

* * * * *

REEXAMINATION CERTIFICATE (846th)
United States Patent [19]
Lee et al.

[11] B1 3,859,575
[45] Certificate Issued     May 3, 1988

[54] VARIABLE CAPACITANCE SENSOR

[76] Inventors: Shih-Ying Lee; Yao-Tzu Li, both of Huckleberry Hill, Lincoln, Mass. 01773

Reexamination Request:
No. 90/001,260, Jun. 5, 1987

Reexamination Certificate for:
| | |
|---|---|
| Patent No.: | 3,859,575 |
| Issued: | Jan. 7, 1975 |
| Appl. No.: | 441,026 |
| Filed: | Feb. 11, 1974 |

[51] Int. Cl.⁴ .............................................. H01G 7/00
[52] U.S. Cl. .................................... 361/283; 73/724; 361/274

[56] References Cited
U.S. PATENT DOCUMENTS

| | | | |
|---|---|---|---|
| 1,804,698 | 5/1931 | Luckey . | |
| 2,101,153 | 12/1937 | Muth et al. | 175/41 |
| 2,115,143 | 4/1938 | Harrison | 173/269 |
| 2,164,638 | 7/1939 | Broeze et al. | 171/327 |
| 2,171,655 | 9/1939 | Johnson | 175/41.5 |
| 2,179,068 | 11/1939 | Sprague | 175/41.5 |
| 2,179,417 | 11/1939 | Maxham | 175/41.5 |
| 2,367,866 | 1/1945 | Humphreys et al. | 177/311 |
| 2,568,238 | 9/1951 | Le Van | 73/395 |
| 2,896,138 | 7/1959 | Grinstead | 317/246 |
| 3,000,215 | 9/1961 | Atanasoff et al. | 73/398 |
| 3,229,512 | 1/1966 | Goudswaard et al. | 73/88.5 |
| 3,230,431 | 1/1966 | Deniston | 317/249 |
| 3,280,628 | 10/1966 | Schloss | 73/301 |
| 3,347,272 | 10/1967 | Rast | 138/30 |
| 3,356,917 | 12/1967 | Goldstein | 317/245 |
| 3,411,348 | 11/1968 | Schultheis, Jr. | 73/141 |
| 3,418,546 | 12/1968 | Beavers et al. | 317/246 |
| 3,479,879 | 11/1969 | Music | 73/398 |
| 3,814,998 | 6/1974 | Thoma et al. | 317/246 |

FOREIGN PATENT DOCUMENTS

| | | |
|---|---|---|
| 1924183 | 1/1970 | Fed. Rep. of Germany . |
| 1648764 | 6/1971 | Fed. Rep. of Germany . |
| 1552069 | 11/1968 | France . |
| 130688 | 1/1951 | Sweden . |
| 210421 | 4/1968 | U.S.S.R. . |
| 513771 | 10/1939 | United Kingdom . |

OTHER PUBLICATIONS

Russian Publication Izmerital'naia Tekhnika, Mar. 1969 Issue (issue #3), "Capacitive Displacement Transducer with Deflecting Electrodes", A. P. Gritsenko, A. E. Kritskii and I. N. Magda, pp. 47–49.

Sanderson, et al., A Micro-Miniature Solid-State Capacitive Blood Pressure Transducer with Improved Sensitivity, IEEE Transactions on Biomedical Engineering, vol. BME 20, No. 4, Jul., 1973, pp. 312-314 (IEEE, Inc., N.Y.).

Setra Systems, Inc., "Gage Pressure Transducer, Model 200", Product Brochure (1969).

*Primary Examiner*—Michael L. Gellner

[57]     ABSTRACT

A variable capacitance sensor is constructed with its capacitance plates connected at their center. The conducting surfaces forming the capacitor are insulated from the central connection and each other. Stress relieving means are provided to eliminate hysteresis effects from the connecting structure. The structure provides decreased thermal path lengths to reduce thermal effects. The change in capacitance producted by a displacement in response to supplied pressure or force is increased by maximizing the displacement at peripheral regions having the largest area.

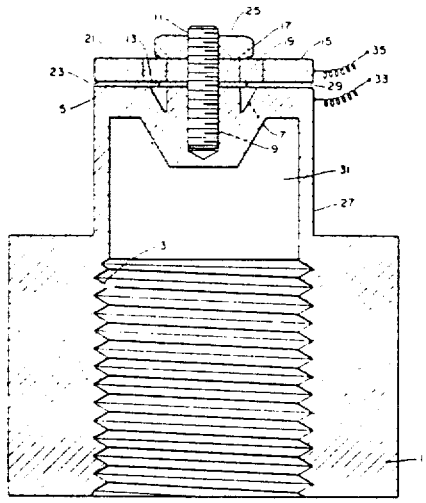

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-6, dependent on an amended claim, are determined to be patentable.

1. A pressure sensing capacitor comprising *a generally tubular shaped member,* an [edge-supported] elastic member responsive to pressure *in said generally tubular member and* having a conducting portion *and secured continuously at its periphery to said tubular member to contain said pressure,* a flat electrode member with a central support means, a periphery conductive means and an insulative means connecting said periphery conductive means and said central support means in fixed spaced relationship, means physically in contact with the center of said elastic member responsive to pressure and said central support means and spacing said periphery conductive means and said conducting portion of said elastic member responsive to pressure and said central support means and spacing said periphery conductive means and said conducting portion of said elastic member [in capacitive relationship] *to form a single variable capacitor,* whereby when force is applied to [the center of] the elastic member the spacing between the conducting portion and the periphery conductive means will vary.

* * * * *